United States Patent Office 3,238,061

Patented Mar. 1, 1966

3,238,061

PROCESS FOR PRODUCING MAGNETIC FILMS

Herman Koretzky and Bernard Leland, Poughkeepsie, N.Y., assignors to International Business Machines Corporation, New York, N.Y., a corporation of New York No Drawing. Filed May 25, 1962, Ser. No. 197,618

10 Claims. (Cl. 117—138.8)

This invention relates to Co-Ni films having improved magnetic properties and, in particular, to the improved process for producing these films and to the improved magnetic recording impulse memory devices formed with these films.

Magnetic recording impulse memory devices are extensively used in computer and data processing systems and, in many instances, are indispensible to such systems. These devices generally involve a carrier on which a thin film of magnetic material has been deposited and may exist in any one of a variety of forms—tapes, belts, drums and discs being the most common. A signal is stored on these devices by selectively magnetizing the film at a given point to represent the signal at one moment in time.

With the present trend being toward high speed-high storage capacity data processing systems, requirements have been introduced for the magnetic recording impulse memory devices which were not encountered in the previous systems. Rapid response to digital signals, large storage capacity of digital intelligence (high density) and nearly perfect reliability are all required in a magnetic recording impulse memory device for use in a high speed-high storage capacity system.

The degree to which a magnetic recording impulse memory device fulfills these requirements depends, in large, upon its moment of inertia, flexibility, remanence (Br), and coercivity (Hc). Low moment of inertia and high flexibility are needed for the device to travel at high speed about capstans and bearing members without undue wear to either the device or to the system members while high remanence, and coercivity are required for nearly perfect reliability and high storage capacity.

To provide the necessary combination of magnetic and mechanical properties, magnetic recording impulse memory devices are required which combine the high flexibility and low moment of inertia of a polymeric material with the magnetic qualities of a metal film—such as metal film superimposed on a polymeric carrier. However, the present procedures available in the prior art do not lend themselves to the production of such devices.

For example, it is not possible to directly electrodeposit a metal film on a polymeric carrier. A conductive medium is required on the polymeric carrier before electrodeposition can take place. A disadvantage of this is that the opportunity for stray currents to develop is increased in the magnetic recording impulse memory device. Vapor deposition, cathode sputtering and the like do not offer films of the required magnetic quality. As a result it has been an object of considerable research to find a suitable procedure to produce the required magnetic recording impulse memory devices.

We have found that satisfactory films consisting of Co-Ni can be produced by electroless deposition and applied to non-conductive carriers in a very effective manner. The films produced according to our present invention adhere firmly to non-conductive carriers and possess high remanence and coercivity.

It has been known for some time that Co-Ni films are obtainable from an aqueous solution of their salts by the reducing action of hypophosphite ion. It is further known that the addition of ammonia or of organic nitrogen-containing bases lowers the phosphorous content in the resulting deposit. However, prior methods involving such electroless deposition were concerned with providing films of high electrical conductivity and this requires films with relatively few impurities or dislocations—conditions not conducive for high coercivity.

It is therefore a principal object of this invention to provide Co-Ni films which have high remanence and coercivity.

It is a further object of this invention to provide an improved process for electrolessly depositing Co-Ni films which have high remanence and coercivity.

It is another object of this invention to provide improved magnetic recording impulse memory device having high speed-high storage capabilities.

It is still a further object of this invention to provide an improved process for electrolessly depositing Co-Ni films having high remanence and coercivity on carrier surfaces to form media for storing digital intelligence at high densities.

The foregoing and other objects, features and advantages of the invention will be apparent from the following more particular description of preferred embodiments of the invention.

By virtue of theoretical considerations and subsequent experimentation we have discovered that Co-Ni films having high remanence and coercivity are electrolessly deposited on carrier surfaces from an aqueous solution in which there is dissolved 0.0064 to 0.42 mole/liter nickel ions; 0.064 to 0.67 mole/liter cobalt ions; 0.095 to 0.36 mole/liter hypophosphite ions; and, sufficient additive of organic nitrogen bases containing at least one C-N bond to provide a pH of at least 5.8. This is most surprising since it was previously believed that the addition of an organic nitrogen base to raise the pH of the solution would not permit sufficient phosphorus to deposit and produce the impurities, precipitates and dislocations which are required for high coercivity. On the contrary we have found that by dissolving organic amines containing at least one C-N bond in the aqueous solution in accordance with the present invention, a Co-Ni film is produced having high coercivity and remanance. The precise mechanism responsible for these unusual results has not been determined. Boundary displacement and domain rotation are presently the two schemes available for explaining magnetic phenomenon but neither of the two offer a complete explanation.

There appears to be no critical upper limit on concentration save solubility, but there is in general no advantage in employing more than is required to provide a pH over 10. Desirable magnetic properties are obtained with just enough base product to achieve a pH of 5.8, and preferably a pH between 7.0 to 9.5. However, even better magnetic quality is obtained by adding the base product beyond the point where pH changes to the point of complete saturation.

A preferred process according to this invention for producing magnetic films having high remanence and coercivity comprises electrolessly depositing cobalt-nickel alloy from an aqueous solution in which there is dissolved 0.0064 to 0.42 mole/liter nickel ions; 0.064 to 0.67 mole/liter cobalt ions; 0.095 to 0.36 mole/liter hypophosphite ions; 0.092 to 0.89 mole/liter of a complexing agent selected from the group consisting of citrate, tartrate and succinate ions; and, sufficient organic nitrogen base containing at least one C-N bond selected from the group of water soluble organic amines and the quaternized derivaties of said amines to provide a pH of at least 5.8 in the aqueous solution.

In order to more fully describe the invention, specific examples of the solutions, solution parameter, and film characteristics are given in Tables 1, 2 and 3 below. In Table 3, the magnetic quality—remanence, saturation induction and coercivity—of the film are given in terms of Br, Bs, and Hc (respectively). Br and Bs are given in (kilo) gauss and Hc in oersteds. The solutions described are intended only as examples and illustrations of the principles of the invention but not as limitations as to quantitative composition. Neither should the description be construed as a limitation excluding the use of compounds of a closely related chemical nature.

TABLE 2

*Solution parameters*

| Example | Temp., ° C. | Time (Sec.) | pH |
|---|---|---|---|
| 1 | 90 | 40 | 8.7 |
| 2 | 85 | 40 | 8.2 |
| 3 | 82 | 40 | 8.8 |
| 4 | 85 | 40 | 8.3 |
| 6 | 85 | 40 | 8.4 |
| 7 | 75 | 40 | 8.2 |
| 8 | 80 | 40 | 8.8 |
| 9 | 80 | 40 | 8.1 |
| 10 | 80 | 40 | 8.0 |
| 11 | 69 | 40 | 7.4 |
| 12 | 75 | 25 | 7.8 |
| 14 | 85 | 40 | 7.9 |
| 15 | 77 | 40 | 8.2 |
| 16 | 84 | 40 | 7.4 |
| 17 | 84 | 40 | 5.8 |
| 18 | 84 | 40 | 9.5 |
| 19 | 86 | 120 | 8.0 |
| 20 | 87 | 60 | 8.4 |
| 21 | 90 | 120 | 7.2 |
| 22 | 90 | 40 | 8.0 |
| 23 | 80 | 120 | 8.4 |
| 26 | 85 | 120 | 8.2 |
| 27 | 75 | 40 | 8.2 |
| 28 | 75 | 40 | 8.6 |
| 29 | 81 | 40 | 8.6 |
| 30 | 80 | 40 | 9.45 |

TABLE 1

*Solution constituents in moles/liter*

| Example | Ni Ions | Co Ions | Hypophosphite ons | Sodium Potassium Tartrate | Sodium Citrate | Sodium Succinate | Ammonium Chloride | Ammonium hydroxide | Organic Nitrogen Base |
|---|---|---|---|---|---|---|---|---|---|
| 1 | 0.065 | 0.064 | .095 | | 0.34 | | 0.94 | 0.34 | 2.3 (Morpholine). |
| 2 | 0.42 | 0.42 | 0.36 | | 0.51 | | 0.96 | | 6.9 (Morpholine). |
| 3 | 0.17 | 0.67 | 0.36 | | 0.51 | | 0.96 | | 1.7 (Morpholine). |
| 4 | 0.084 | 0.34 | 0.18 | 0.89 | | 0.19 | 0.48 | | 0.87 (Morpholine). |
| 6 | 0.17 | 0.67 | 0.36 | 0.35 | 0.092 | | 0.96 | | 0.87 (Morpholine). |
| 7 | 0.084 | 0.34 | 0.18 | 0.53 | 0.26 | 0.092 | 0.48 | | 0.87 (Morpholine). |
| 8 | 0.084 | 0.34 | 0.18 | | (0.15 Hydrochloric Acid) | | | | 2.0 (Morpholine). |
| 9 | 0.17 | 0.66 | 0.36 | | 0.51 | | 0.96 | | 3.18 (Morpholine). |
| 10 | 0.084 | 0.34 | 0.18 | 0.27 | | | 0.48 | | 0.87 (Morpholine). |
| 11 | 0.17 | 0.66 | 0.36 | | | | 9.96 | | 0.87 (Morpholine). |
| 12 | 0.05 | 0.20 | 0.095 | 0.71 | | | 0.93 | 0.34 | 1.74 (N-Ethyl-Morpholine). |
| 14 | 0.05 | 0.20 | 0.095 | 0.71 | | | 0.93 | | 0.085 (2-Diethylaminoethanol). |
| 15 | 0.05 | 0.20 | 0.095 | 0.71 | | | 0.93 | | 0.048 (Diethanolamine). |
| 16 | 0.17 | 0.67 | 0.36 | | | | | | 1.15 (Morpholine). |
| 17 | 0.17 | 0.67 | 0.36 | | 0.51 | | 0.95 | | 0.71 (Diethanolamine). |
| 18 | 0.084 | 0.34 | 0.18 | | 0.26 | | 0.48 | | 1.43 (Diethanolamine). |
| 19 | 0.084 | 0.34 | 0.18 | | 0.26 | | 0.48 | | 3.56 (Triethanolamine). |
| 20 | 0.084 | 0.34 | 0.18 | | 0.26 | | 0.48 | | 2.75 (Diethylamine). |
| 21 | 0.17 | 0.67 | 0.36 | | 0.51 | | 0.96 | | 1.4 (N-Aminopropyl-morpholine). |
| 22 | 0.17 | 0.67 | 0.36 | | | | 0.96 | 0.85 | 0.46 (Tetramethylammonium Chloride). |
| 23 | 0.17 | 0.67 | 0.36 | | | | 0.96 | | 2.3 (Morpholine). |
| 26 | 0.05 | 0.20 | 0.19 | | 0.26 | | 0.47 | | 1.74 (N-Ethyl-Morpholine). |
| 27 | 0.084 | 0.20 | 0.19 | | 0.26 | | 0.47 | | 0.59 (Piperidine). |
| 28 | 0.084 | 0.20 | 0.19 | | 0.26 | | 0.47 | | 0.96 (Tetramethyl-guanidine). |
| 29 | 0.084 | 0.20 | 0.19 | | 0.26 | | 0.47 | | 0.58 (Piperazine). |
| 30 | 0.0064 | 0.12 | 0.19 | | 0.12 | | 0.93 | | 0.87 (Morpholine). |

TABLE 3

*Film characteristics*

| Example | Hc Oersteds | Br Kilogauss | Bs Kilogauss | $Br/B_s$ | o/o P | Co/Ni | Thickness in Microinches |
|---|---|---|---|---|---|---|---|
| 1 | 400 | 8.2 | 13.1 | 0.62 | 0.8 | 1.7 | 7 |
| 2 | 500 | 8.0 | 11.2 | 0.71 | 1.2 | 2.3 | 15 |
| 3 | 600 | 10.2 | 15.8 | 0.65 | 1.1 | 6.1 | 8 |
| 4 | 690 | 7.0 | 13.2 | 0.53 | 1.7 | 4.2 | 6 |
| 6 | 320 | 7.0 | 10.4 | 0.67 | 4.0 | 1.2 | 11 |
| 7 | 880 | 7.2 | 11.7 | 0.62 | 2.2 | 3.1 | 8 |
| 8 | 1,275 | 7.0 | 12.8 | 0.55 | 3.1 | 4.2 | 6 |
| 9 | 1,500 | 8.2 | 10.8 | 0.76 | 2.0 | 4.7 | 6 |
| 10 | 1,100 | 7.1 | 14.1 | 0.50 | 1.8 | 3.9 | 8 |
| 11 | 450 | 8.2 | 10.4 | 0.79 | 1.1 | 7.2 | 12 |
| 12 | 750 | 9.1 | 11.7 | 0.78 | 1.7 | 3.6 | 11 |
| 14 | 920 | 7.7 | 12.8 | 0.60 | 1.2 | 8.0 | 11 |
| 15 | 275 | 8.3 | 13.6 | 0.61 | 1.8 | 7.3 | 8 |
| 16 | 440 | 8.8 | 12.7 | 0.69 | 1.1 | 4.0 | 9 |
| 17 | 350 | 9.2 | 15.2 | 0.61 | 1.3 | 4.6 | 9 |
| 18 | 500 | 9.6 | 15.0 | 0.64 | 2.7 | 4.3 | 7 |
| 19 | 650 | 11.3 | 12.7 | 0.89 | 1.8 | 3.8 | 13 |
| 20 | 490 | 7.7 | 10.7 | 0.71 | 1.1 | 4.7 | 12 |
| 21 | 625 | 7.2 | 11.9 | 0.61 | 1.8 | 9.2 | 10 |
| 22 | 350 | 7.0 | 13.2 | 0.53 | 1.9 | 2.7 | 9 |
| 23 | 1,120 | 7.8 | 13.2 | 0.59 | 1.6 | 11 | 8 |
| 26 | 600 | 7.8 | 11.1 | 0.70 | 2.2 | 6.2 | 14 |
| 27 | 1,250 | 8.3 | 15.2 | 0.55 | 3.1 | 4.0 | 9 |
| 28 | 1,150 | 8.1 | 12.6 | 0.64 | 1.7 | 4.9 | 9 |
| 29 | 1,375 | 8.8 | 13.7 | 0.64 | 2.1 | 4.4 | 6 |
| 30 | 940 | 8.7 | 11.9 | 0.73 | 2.7 | 12 | 7 |

Sulfate salts are preferred over chloride salts for furnishing the cobalt and nickel ions. Generally, by using sulfates a brighter film with a relatively faster deposition rate is obtained. However, the anions do not influence the magnetic properties of the films. In the tables, the solution of Examples 1 to 8 were made with sulfate salts while the remainder with chloride salts.

The complexing agents such as the tartrates, citrates and succinates are used in the solutions to: (1) prevent solution precipitation, (2) prevent self-deposition from occurring in the solution, and (3) to regulate the rate of deposition. It is believed that a fast rate of deposition results in a finer particle size and, therefore, a higher coercivity. It is also believed that a slow rate of deposition produces a large particle size and, consequently, a lower coercivity. It has been found, which is brought out in the examples, that there is an optimum concentration for these complexing agents and when they are used in excess of this range, the resultant coercivity is reduced.

The hypophosphite ion concentration effects the phosphorus content in the film. In the examples sodium hypophosphite was used as the source for the hypophosphite ions. Any hypophosphite source providing the necessary hypophosphite ion may be used.

The carrier on which the magnetic film is deposited may be conductive or non-conductive. For high speed-high storage capacities magnetic recording impulse memory devices, polymeric carriers are required and the polymeric carrier preferred is poly (ethylene) terephthalate. In the examples heretofore described, the films were deposited on polymeric carriers of poly (ethylene) terephthalate having a thickness of about one mil and a width of about one half inch.

Prior to depositing the magnetic film, the carrier surface must be rendered catalytic. With a conductive carrier such as brass, for example, strips of the metal are buffed on a polishing wheel and boiled in distilled water for about thirty minutes before using. They are then dipped into an activating solution, rinsed with distilled water, dipped into an activating solution, rinsed again in distilled water and then used. Activating solutions of stannous and palladium chloride are used which are well known in the art.

Similar procedures are used with polymeric carriers such as poly (ethylene terephthalate), however, it is preferable to replace the boiling water immersion with solutions which are the subject of a co-pending application of the present applicants, Serial No. 153,187, filed November 17, 1961, now U.S. Patent 3,142,582. In that application a process is described for activating the adhesion properties of polymeric material by exposing the material to a first solution of 0.31 to 0.57 mol percent sodium dichromate, 33.4 to 53.8 mol percent sulfuric acid and the balance water; and, then exposing the material to an alkaline solution containing sodium hydroxide in concentrations ranging from 2.49 moles per liter to 7.48 moles per liter.

Concentrations as low as 0.048 mole/liter of organic nitrogen base are used and any organic nitrogen base containing at least one C-N bond can be used in the practice of this invention. Primary, secondary and tertiary amines; saturated and unsaturated amines; substituted and unsubstituted amines; monoamines and polyamines; and the quaternized derivatives of these amines, are all operable. Particularly preferred in the practice of this invention are those organic nitrogen bases containing at least one C-N bond selected from the group of water soluble organic amines and their quaternized derivatives where the organic amines are represented by the structural configuration,

in which each of $R_1$ and $R_2$ are substituents of the group consisting of hydrogen, alkyl, alkenyl, alkynyl, alkoxy, amino, and hydroxy-substituted, and amino-substituted alkyl, alkenyl, and alkynyl groups, $R_3$ is a substitutent of the group consisting of hydrogen, alkyl, alkenyl, alkynyl, and hydroxy-substituted, and amino-substituted alkyl, alkenyl and alkynyl groups, and further members in which $R_1$ and $R_2$ taken together with N form a heterocyclic ring containing up to 6 carbon atoms.

In accordance with the invention, a high speed-high storage capacity magnetic recording impulse memory device is provided comprising a magnetic film on a surface of a carrier. With a polymeric carrier such as poly (ethylene terephthalate) and a surface film of Co-Ni, it is possible to store 10,000 units of digital intelligence per linear inch. Because of the limitations imposed by the available recording systems, it is not possible to determine the ultimate storage capacity of the magnetic recording impulse memory devices made in accordance with the invention. It is believed, however, that signals having wave-lengths twice the thickness of the film should still allow a stable equilibrium of recorded dipoles. The Co-Ni films provided have a wide range of controlled magnetic properties. As is brought out by Table 3, the magnetic films which are deposited on the carrier surface have a thickness between 2 to 15 microinches, a coercivity (Hc) in the range between 275 to 1500 oersteds, a remanence (Br) in the range between 7000 to 11,700 gauss and have a ratio of cobalt to nickel (Co/Ni) in the range between 1.2/1 to 15/1.

Table 3 further indicates that the magnetic films have a squareness (Br/Bs) of at least 0.53 and as high as 0.98. The ratio of remanence (Br) to saturation induction (Bs) is usually referred to as squareness and is a highly desirable characteristic for the recording surface of a magnetic recording impulse memory device. Films having this characteristic permit accurate discrimination between the recorded signals for narrow transition regions are provided between magnetized adjacent areas along the recording surface.

While there has been described and pointed out the fundamental novel features of the invention as applied to preferred embodiment, it will be understood that various omissions and substitutions and changes in the form and details of the invention illustrated may be made by those skilled in the art without departing from the spirit of the invention. It is therefore the intention thereof to be limited only as indicated by the scope of the following claims.

What is claimed is:

1. The process for producing a magnetic film having a coercivity greater than 350 oersteds on a catalytic polymeric carrier which comprises electrolessly deposting cobalt-nickel alloy from an aqueous solution in which there is dissolved 0.0064 to 0.42 mole/liter nickel ions; 0.064 to 0.67 mole/liter cobalt ions; 0.095 to 0.36 mole/liter hypophosphite ions; 0.092 to 0.89 mole/liter of a complexing agent selected from the group consisting of citrate, tartrate and succinate ions; and, sufficient organic nitrogen base containing at least one C-N bond selected from the group consisting of organic amines and the quaternized derivatives of said amines to provide a pH of at least 5.8 where said organic amines are represented by the structural configuration

in which each of $R_1$ and $R_2$ are substituents of the group consisting of hydrogen, alkyl, alkenyl, alkynyl, alkoxy, amino, and hydroxy-substituted, and amino-substituted alkyl, alkenyl, and alkynyl groups, $R_3$ is a substituent of the group consisting of hydrogen, alkyl, alkenyl, alkynyl, and hydroxy-substituted, and amino-substituted alkyl, alkenyl and alkynyl groups, and further members in which $R_1$ and $R_2$ taken together with N form a heterocyclic ring containing up to 6 carbon atoms.

2. The process for producing a magnetic recording impulse memory device having a coercivity greater than 350 oersteds which comprises contacting a catalytic polymeric carrier with an aqueous solution in which there is dissolved 0.0064 to 0.42 mole/liter nickel ions; 0.064 to 0.67 mole/liter cobalt ions; 0.095 to 0.36 mole/liter hypophosphite ions; 0.092 to 0.89 mole/liter of a complexing agent selected from the group consisting of citrate, tartrate and succinate ions; and, at least 0.048 mole/liter of organic nitrogen base containing at least one C-N bond selected from the group consisting of organic amines and the quaternized derivatives of said amines where said organic amines are represented by the structural configuration

in which each of $R_1$ and $R_2$ are substituents of the group consisting of hydrogen, alkyl, alkenyl, alkynyl, alkoxy, amino, and hydroxy-substituted, and amino-substituted alkyl, alkenyl, and alkynyl groups, $R_3$ is a substituent of the group consisting of hydrogen, alkyl, alkenyl, alkyl, and hydroxy-substituted, and amino-substituted alkyl, alkenyl and alkynyl groups, and further members in which $R_1$ and $R_2$ taken together with N form a heterocyclic ring containing up to 6 carbon atoms.

3. The process for producing a magnetic recording impulse memory device having a coercivity greater than 350 oersteds which comprises immersing a catalytic polymeric carrier in an aqueous solution in which there is dissolved 0.0064 to 0.42 mole/liter nickel ions; 0.064 to 0.67 mole/liter cobalt ions; 0.095 to 0.36 mole/liter hypophosphite ions; 0.092 to 0.89 mole/liter of a complexing agent selected from the group consisting of citrate, tartrate and succinate ions; and sufficient morpholine to provide a pH in the range between 7.0 to 9.5.

4. The process for producing a magnetic recording impulse memory device having a coercivity greater than 350 oersteds which comprises immersing a catalytic polymeric carrier in an aqueous solution in which there is dissolved 0.0064 to 0.42 mole/liter nickel ions; 0.064 to 0.67 mole/liter cobalt ions; 0.095 to 0.36 mole/liter hypophosphite ions; 0.092 to 0.89 mole/liter of a complexing agent selected from the group consisting of citrate, tartrate and succinate ions; and, sufficient triethylenediamine to provide a pH in the range between 7.0 to 9.5.

5. The process for producing a magnetic recording impulse memory device having a coercivity greater than 350 oersteds which comprises immersing a catalytic polymeric carrier in an aqueous solution in which there is dissolved 0.0064 to 0.42 mole/liter nickel ions; 0.064 to 0.67 mole/liter cobalt ions; 0.095 to 0.36 mole/liter hypophosphite ions; 0.092 to 0.89 mole/liter of a complexing agent selected from the group consisting of citrate, tartrate and succinate ions; and, sufficient triethanolamine to provide a pH in the range between 7.0 to 9.5.

6. The process for producing a magnetic recording impulse memory device having a coercivity greater than 350 oersteds which comprises immersing a catalytic polymeric carrier in an aqueous solution in which there is dissolved 0.0064 to 0.42 mole/liter nickel ions; 0.064 to 0.67 mole/liter cobalt ions; 0.095 to 0.36 mole/liter hypophosphite ions; 0.092 to 0.89 mole/liter of a complexing agent selected from the group consisting of citrate, tartrate and succinate ions; and, sufficient 2-diethylaminoethanol to provide a pH in the range between 7.0 to 9.5.

7. The process for producing a magnetic recording impulse memory device having a coercivity greater than 350 oersteds which comprises immersing a catalytic polymeric carrier in an aqueous solution in which there is dissolved 0.0064 to 0.42 mole/liter nickel ions; 0.064 to 0.67 mole/liter cobalt ions; 0.095 to 0.36 mole/liter hypophosphite ions; 0.092 to 0.89 mole/liter of a complexing agent selected from the group consisting of citrate, tartrate and succinate ions, and sufficient tetramethyl guanidine to provide a pH in the range between 7.0 to 9.5.

8. The process for producing a magnetic recording impulse memory device having a coercivity greater than 350 oersteds which comprises immersing a catalytic polymeric carrier in an aqueous solution in which there is dissolved 0.0064 to 0.42 mole/liter nickel ions; 0.064 to 0.67 mole/liter cobalt ions; 0.095 to 0.36 mole/liter hypophosphite ions; 0.092 to 0.89 mole/liter of a complexing agent selected from the group consisting of citrate, tartrate and succinate ions, and sufficient piperazine to provide a pH in the range between 7.0 to 9.5.

9. The process for producing a magnetic film having a coercivity greater than 350 oersteds on a catalytic carrier which comprises electrolessly depositing cobalt-nickel alloy from an aqueous solution in which there is dissolved 0.0064 to 0.42 mole/liter nickel ions; 0.064 to 0.67 mole/liter cobalt ions; 0.095 to 0.36 mole/liter hypophosphite ions; and, sufficient organic nitrogen base containing at least one C-N bond selected from the group consisting of organic amines and the quaternized derivatives of said amines to provide a pH of at least 5.8 where said organic amines are represented by the structural configuration

in which each of $R_1$ and $R_2$ are substituents of the group consisting of hydrogen, alkyl, alkenyl, alkynyl, alkoxy, amino, and hydroxy-substituted, and amino-substituted alkyl, alkenyl, and alkynyl groups, $R_3$ is a substituent of the group consisting of hydrogen, alkyl, alkenyl, alkynyl, and hydroxy-substituted, and amino-substituted alkyl, alkenyl and alkynyl groups, and further members in which $R_1$ and $R_2$ taken together with N form a hetero-cyclic ring containing up to 6 carbon atoms.

10. The process for producing a magnetic film having a coercivity greater than 350 oersteds on a catalytic carrier surface which comprises electrolessly depositing cobalt-nickel alloy from an aqueous solution in which there is dissolved 0.0064 to 0.42 mole/liter nickel ions; 0.064 to 0.67 mole/liter cobalt ions; 0.095 to 0.36 mole/liter hypophosphite ions; 0.092 to 0.36 mole/liter hypophosphite ions; 0.092 to 0.89 mole/liter of a complexing agent selected from the group consisting of citrate, tartrate and succinate ions; and sufficient organic nitrogen base containing at least one C-N bond selected from the group consisting of organic amines and the quaternized derivatives of said amines to provide a pH of at least 5.8 where said organic amines are represented by the structural configuration

in which each of $R_1$ and $R_2$ are substituents of the group consisting of hydrogen, alkyl, alkenyl, alkynyl, alkoxy, amino, and hydroxy-substituted, and amino-substituted alkyl, alkenyl, and alkynyl groups, $R_3$ is a substituent of the group consisting of hydrogen, alkyl, alkenyl, alkynyl, and hydroxy-substituted, and amino-substituted alkyl, alkenyl and alkynyl groups, and further members in which $R_1$ and $R_2$ taken together with N form a heterocyclic ring containing up to 6 carbon atoms.

References Cited by the Examiner

UNITED STATES PATENTS

| | | | |
|---|---|---|---|
| 2,772,183 | 11/1956 | Talmey et al. | 117—130 |
| 2,847,327 | 8/1958 | Talmey et al. | 117—1303 |
| 3,096,182 | 7/1963 | Berzins | 117—130 |
| 3,116,159 | 12/1963 | Fisher et al. | 117—47 |
| 3,138,479 | 6/1964 | Foley | 117—47 |
| 3,150,939 | 9/1964 | Wenner | 29—195 |

WILLIAM D. MARTIN, *Primary Examiner.*

MURRAY KATZ, *Examiner.*